United States Patent [19]

Borrelli et al.

[11] Patent Number: 4,854,957
[45] Date of Patent: Aug. 8, 1989

[54] METHOD FOR MODIFYING COLORATION IN TINTED PHOTOCHROMIC GLASSES

[75] Inventors: Nicholas F. Borrelli, Elmira; Paul A. Sachenik, Corning, both of N.Y.

[73] Assignee: Corning Incorporated, Corning, N.Y.

[21] Appl. No.: 181,180

[22] Filed: Apr. 13, 1988

[51] Int. Cl.$^4$ .................... C03C 4/06; C03C 21/00
[52] U.S. Cl. .................... 65/30.11; 65/32.3; 501/13
[58] Field of Search .............. 65/30.11, 32; 501/13

[56] References Cited

U.S. PATENT DOCUMENTS

| | | | |
|---|---|---|---|
| 3,208,860 | 7/1962 | Armistead et al. | 106/54 |
| 3,892,582 | 7/1975 | Simms | 106/52 |
| 3,920,463 | 11/1975 | Simms | 106/54 |
| 4,076,395 | 2/1978 | Deeg et al. | 65/30.11 |
| 4,118,214 | 10/1978 | Wedding | 501/13 |
| 4,125,404 | 11/1978 | ARaujo et al. | 106/54 |
| 4,125,405 | 11/1978 | Araujo et al. | 106/54 |
| 4,190,451 | 2/1980 | Hares et al. | 106/47 |
| 4,240,836 | 12/1980 | Borrelli et al. | 106/47 |
| 4,284,686 | 8/1981 | Wedding | 501/13 |
| 4,290,794 | 9/1981 | Wedding | 65/30.11 |
| 4,614,530 | 9/1986 | Sukkar | 65/30.11 |
| 4,769,310 | 9/1988 | Gugger et al. | 65/30.11 |

OTHER PUBLICATIONS

"Photoinduced Optical Anisotropy and Color Adaptation in Silver-Containing Glasses", *Appl. Phys. Lett.*, 34 (6), pp. 375–397 (1979), Nicholas F. Borrelli et al.

*Primary Examiner*—Peter Kratz
*Attorney, Agent, or Firm*—Kees van der Sterre

[57] ABSTRACT

A metod for making a photochromic glass article exhibiting a surface color pattern wherein a silver halide-containing photochromic glass article is treated by exposing at least a portion of the surface thereof to a patterned heat source for a time sufficient to raise the temperature of at least a part of the exposed portion above about 450° C., is described. The glass may be exposed to the patterned heat source either before or after thermal reduction coloring. Patterned heating to a temperature in the transformation range of the glass is used where a post-patterning thermal reduction coloration step is to be used, in order to render the glass resistant to reduction coloration in the patterned area.

9 Claims, 1 Drawing Sheet

METHOD FOR MODIFYING COLORATION IN TINTED PHOTOCHROMIC GLASSES

BACKGROUND OF THE INVENTION

The present invention relates to a method for modifying the coloration of tinted or colored photochromic glasses, and more particularly to a method for treating photochromic glasses to modify the coloration induced therein by thermal reduction treatments.

Photochromic glasses may be generally characterized as glasses which darken upon exposure to actinic radiation, e.g., ultraviolet light, and which fade in color upon the removal of the activating light. Such glasses have been widely commercialized for the manufacture of ophthalmic lens blanks which will darken under bright outdoor conditions and fade in shade or indoors. Sunglass lenses have also been made of photochromic glasses of this type.

All of the commercially important photochromic glasses are glasses which contain a precipitated microcrystalline silver halide phase. It is this phase which is considered to cause the reversible darkening of the glass under exposure to light. U.S. Pat. No. 3,208,860 provides the basic description of this family of glasses. Subsequent work has resulted in the development of many new families of photochromic glasses exhibiting faster darkening and/or fading response. U.S. Pat. No. 4,190,451, for example, provides a description of some recently developed photochromic glasses of this type.

Photochromic glasses exhibiting a fixed color or tint in the undarkened state have also been commercially developed. Such have included glasses containing conventional glass colorants, as well as glasses wherein coloration is imparted by treatment of the glass after manufacture with a coloring surface treatment, rather than by the inclusion of glass colorants in the composition. U.S. Pat. Nos. 3,892,582 and 3,920,463, for example, disclose thermal reduction treatments useful for imparting yellow surface colors to photochromic glasses, while U.S. Pat. No. 4,240,836 describes a modified thermal reduction treatment which permits the development of a broader range of colors in this type of glass. Glasses colored by such reduction treatments (hereinafter sometimes referred to as "reduction-colored photochromic glasses"), may readily be distinguished from glasses colored by the introduction of bulk colorants to the composition in that the color in the former glasses is normally confined to only a very thin layer on the glass surface.

A coloration mechanism which has been postulated for these thermal reduction treatments is the growth of light-absorbing silver metal particles on or near the silver halide crystallites in the glass. Changes in the size and/or configuration of these particles may be responsible for the variations in coloration which are observed.

The effects of optical bleaching on photochromic glasses have long been of interest. U.S. Pat. No. 4,125,404, for example, describes a color adaptation effect observed when a photochromic glass article darkened by exposure to actinic radiation is coincidentally bleached with colored light. The original darkened color of such a glass, which tends to be neutral due to broad-band absorption of the darkened photochromic phase, is permanently modified by such a bleaching treatment such that the darkened color approaches the color of the bleaching radiation.

Optical bleaching has also been employed to modify the color observed in silver halide-containing glasses exhibiting "additive coloration," i.e., color attributable to the presence of permanent absorbing silver particles in the glass. U.S. Pat. No. 4,125,405 describes additively colored glasses and optical bleaching treatments which may be used to permanently modify the color thereof. These glasses may be photochromic glasses or simply colored glasses containing both silver halide and an additional metallic silver coloring phase.

A discussion of the proposed mechanism of color modification in these glasses is provided by N. F. Borrelli et al., "Photoinduced Optical Anisotrophy and Color Adaptation in Silver-Containing Glasses," *Appl. Phys. Lett.*, 34 (6) pages 375–397 (1979). A typical additively colored glass described in that study, which demonstrates strong response to optical bleaching treatments of the kind described, is a silver halide-containing photochromic glass which has been permanently colored by a silver ion-exchange treatment to exchange silver into a surface layer on the glass.

A marked similarity can be observed between photochromic glasses colored by a silver ion exchange treatment as above described and photochromic glasses colored by thermal reduction treatments. The two surface-colored glasses exhibit very similar optical absorption spectra, presumably indicating that a similar silver structure is present in both types of glasses.

It has recently been shown, however, that optical bleaching treatments which are effective to modify the surface colors of additively-colored (e.g. ion-exchanged) glasses are not effective to bleach or otherwise usefully alter the color of reduction-colored glasses, i.e., glasses which have been tinted or colored using thermal reduction treateents. This was unexpected in view of the probability that the observed coloration in both cases is due to the presence of light-absorbing silver particles on or near silver halide crystallites in the glass.

In light of these difficulties, it is a principal object of the present invention to provide a method for modifying the surface coloration of reduction-colored photochromic glasses, that is glasses wherein the surface color has been or will be generated by thermal reduction treatments.

It is a further object of the invention to provide a method for modifying the color of such photochromic glasses which permits color modification on a fine scale, so that highly localized color changes can be induced in the glass.

Other objects and advantages of the invention will become apparent from the following description thereof.

SUMMARY OF THE INVENTION

The present invention provides a method for permanently modifying the surface coloration of reduction-colored silver halide-containing photochromic glasses. The method involves patterned heating of the glass using focused or otherwise directed heat sources, and therefore may conveniently be applied to only selected portions of the glass being treated. Thus with appropriate heating means, detailed optical patterns in reduction-colored photochromic glasses can be developed, permitting the permanent storage of designs or other information in the surface of the colored glass.

Broadly defined, the invention includes a method for making a photochromic glass article exhibiting a surface color pattern. The method comprises, first, selecting for treatment a silver halide-containing photochromic glass article. This is a glass article comprising a microcrystalline silver halide phase and exhibiting darkening when exposed to actinic radiation such as ultraviolet light. The article selected may be one which has received a prior coloring thermal reduction treatment, or it may be untreated photochromic glass, i.e., glass not yet exhibiting a surface reduction coloration.

The article thus selected is next treated by exposing at least a portion of the surface thereof to a patterned or localized heat source for a time sufficient to raise the temperature of at least a part of the surface of the exposed portion above about 450° C. Depending upon the article which has been selected for treatment, the temperature may range from approximately 450° C. up to a temperature effective to permanently modify the reduction coloring properties of the silver halide phase in the glass. For present purposes, the latter temperature is considered to lie in the transformation range of the glass, i.e., between the strain point temperature and the softening temperature thereof, but generally not exceeding the softening point of the glass.

Finally, if not previously colored, the glass article is heated under reducing conditions to a temperature not exceeding about 450° C. for a time sufficient to develop reduction coloration in the glass surface. This step, hereinafter sometimes referred to as the thermal reduction step or treatment, need not be restricted to only selected portions of the glass. Thus general heating of the article will develop normal surface coloration in unexposed regions of the glass, while those portions of the surface previously heated to within the transformation range for the glass will develop only slight optical absorption in the visible portion of the spectrum.

While the method of the invention is particularly unique in its applicability to uncolored photochromic glasses, use of the invention to pattern photochromic glasses colored by a prior thermal reduction treatment offers additional flexibility from a processing standpoint. Hence, the patterning of glass which has been previously reduction colored can be achieved at relatively low thermal patterning temperatures in the above-disclosed heating range between 450° C. and the glass softening point. Yet the relatively low temperature patterned heating still provides strong local changes in the absorption characteristics of the glass surface such that clear patterns corresponding to the heating pattern may readily be produced.

DETAILED DESCRIPTION

Figure 1:
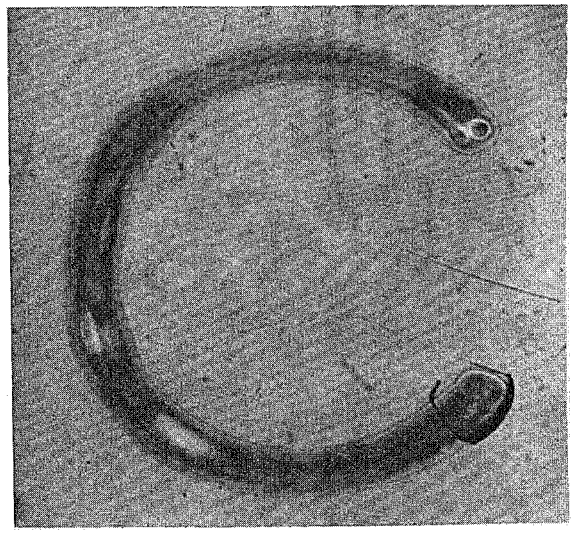
FIG. 1 of the drawing is an optical photomicrograph taken at a magnification of 50× showing a color pattern developed in a surface-colored photochromic glass in accordance with a first embodiment of the invention.

The process of the invention is deemed to have general applicability to silver halide-containing photochromic glasses regardless of the base composition of the glass. Thus, in principle, any glass which can be colored by a thermal reduction treatment may be used.

The preferred glasses, however, are those wherein absorption peaks above wavelengths of about 460 nm. can be developed by suitable thermal reduction treatments. As noted in U.S. Pat. No. 4,240,836, such glasses provide a broad range of potential colors, and for this reason are more easily patterned by a localized heating step than glasses wherein only short wavelength absorption can be thermally generated.

Examples of photochromic glasses which may be patterned in accordance with the invention include those disclosed in U.S. Pat. No. 4,190,451. Those glasses consist essentially, in weight percent, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ ranges between about 0.55–0.85, and wherein the weight ratio Ag:(Cl+Br) ranges between about 0.65–0.95. Optional constituents selected from the group consisting of $ZrO_2$, $TiO_2$, PbO, BaO, CaO, MgO, $Nb_2O_5$, $La_2O_3$, and F may also be included, as may minor amounts of transition metal oxides and/or rare earth metal oxides as inert glass colorants.

Other glasses useful in accordance with the invention are those disclosed in U.S. Pat. 4,018,965. These are silver halide-containing, lithium boroaluminosilicate glasses exhibiting excellent photochromic properties after heat treatment, and which are chemically strengthenable by ion exchange procedures. The disclosed glasses will generally have compositions consisting essentially, in weight percent, as selected from Table I below:

TABLE I

| | | | |
|---|---|---|---|
| $SiO_2$ | 54–66 | $Li_2O + Na_2O + K_2O$ | 6–16 |
| $Al_2O_3$ | 7–15 | Ag | 0.1–1 |
| $B_2O_3$ | 10–25 | Cl | 0.1–1 |
| PbO | 0–3 | Br | 0–3 |
| $Li_2O$ | 0.5–4 | F | 0–2.5 |
| $Na_2O$ | 3.5–15 | Transition metal oxide colorants | 0–1 |
| $K_2O$ | 0–10 | Rare earth metal oxide colorants | 0–5 |

Additional glass compositions which may be treated in accordance with the invention are those reported in U. S. Pat. No. 4,358,542, which are photochromic glasses exhibiting properties improved over those described in the prior art in that they exhibit a deeper darkened transmittance and a more rapid fade rate. These glasses will have compositions consisting essentially, in weight percent on the oxide basis, as shown in the following Table II:

TABLE II

| | | | |
|---|---|---|---|
| $SiO_2$ | 55–60 | PbO | 0.1–0.25 |
| $Al_2O_3$ | 9–10 | Ag | 0.1–0.15 |
| $B_2O_3$ | 19–20.5 | Cl | 0.3–0.5 |
| $Li_2O$ | 2–2.5 | Br | 0.05–0.15 |
| $Na_2O$ | 2–3 | CuO | 0.0065–0.01 |
| $K_2O$ | 6–7 | | |

As the foregoing description indicates, photochromic glasses to be treated in accordance with the invention may comprise colorants such as the conventional coloring oxides which are frequently included in these glasses to control the bulk color thereof. Similarly, they may include additive colorants such as metallic silver which are generally introduced by ion-exchange or similar processing of the glass. Thus it is anticipated that any glass exhibiting good reduction coloring characteristics may be successfully treated by following the localized heating process herein described.

The preferred starting material for use in the process of the invention is a silver-halide containing glass which is photochromic, i.e., which has been treated in the known manner to develop good photochromic darkening and fading response characteristics therein, but which is substantially free of surface reduction coloration. By free of reduction coloration is meant free of surface coloration resulting from the presence, at or near the surface of the glass, of light-absorbing metallic silver particles developed by the heat treatment of the glass under reducing conditions.

The step of heating a surface portion of the photochromic glass article to raise the temperature of that surface portion sufficiently to inhibit subsequent reduction coloration may be carried out utilizing any suitable local heating technique. However it is presently believed that, for uncolored glasses, the temperature of the glass must be raised at least into the glass transformation range, i.e., above the strain point of the glass. Such is believed to be required in order that the silver halide crystallites in the surface of the glass be sufficiently modified, as by re-dissolution in the glass, that the glass will resist surface coloration in the treated areas.

The preferred heat source for this process variation is a localized heat source such as an infrared laser light source capable of emitting radiation at a wavelength which can be strongly absorbed by the glass. Thus, for example, an infrared $CO_2$ laser in combination with a suitable exposure mask permits localized heating and thus constitutes a particularly convenient method for the pattern wise exposure (i.e. the patterned exposure) of a portion of the surface of the glass to the heat source.

The thermal reduction coloration treatment to be applied to the glass following the patterned heating of the uncolored glass surface may be conventional. However, as is known, the development of strong surface coloration in photochromic glasses is favored by heat treatments wherein the glass temperature during treatment does not exceed about 450° C. The use of higher temperatures should be avoided in the present process since such will reduce or even eliminate optical contrast between the heated pattern and the remainder of the surface-colored glass.

The reducing environment in which the glass is treated is not critical, but hydrogen-containing atmospheres, including atmospheres of forming gas or similar reducing gases, may be employed. In general, the most rapid and effective reduction of these glasses for the purpose of coloration is by means of a pure hydrogen atmosphere, which is preferably permitted to flow continuously over the surface of the glass for maximum reduction effect.

Temperatures best suited for generating surface coloration in these glasses will range from about 250°–450° C. As is known, the color of the glass resulting from this treatment depends principally on the temperature at which the treatment is carried out, with the duration of the treatment mainly affecting the depth or intensity of that color. U.S. Pat. No. 4,240,836 provides a complete description of thermal reduction treatments of this type, and that patent is expressly incorporated herein by reference for a further description of such thermal reduction treatments and glass compositions which may be colored thereby.

At the completion of the thermal reduction treatment, the surface colored product exhibits normal surface coloration in regions not subjected to the preliminary heating step. In those sections of the glass surface which have been locally heated into the transformation range, however, only a yellow coloration is observed to develop. Thus the pattern of preliminary heating is preserved and clearly evident in the colored glass.

The invention may be further understood by reference to the following specific examples, which are intended to be illustrative rather than limiting.

EXAMPLE 1

A photochromic glass article consisting of a photochromic sunglass lens blank is selected for treatment. The lens blank has a thickness of about 1.5 mm and is composed of a commercially available photochromic glass, sold as Corning Code 8111 glass under the trademark PHOTOGRAPHY EXTRA. The composition of the glass, in weight percent, is about 55.8% $SiO_2$, 6.5% $Al_2O_3$, 18.0% $B_2O_3$, 1.9% $Li_2O$, 4.0% $Na_2O$, 5.8% $K_2O$, 4.9% $ZrO_2$, 2.2% $TiO_2$, 0.24% Ag, 0.20% Cl, 0.13% Br, and 0.011% CuO.

To achieve local patterned heating of this lens blank, the surface of the blank is exposed, through a ceramic mask defining a curved line pattern, to the infrared beam output of a $CO_2$ laser having a stated output power of 4 watts. The laser is focused to a spot size of approximately 200 $\mu$m, and is caused to scan the mask and exposed glass at a traverse rate of approximately 1 mm/sec. This exposure heats the glass surface to a temperature which is estimated to be in the transformation range of the glass, and at least sufficient to redissolve or otherwise modify the silver halide crystallites in the surface of the glass to render them resistant to subsequent coloration.

Following this exposure, the lens blank is subjected to a thermal reduction treatment comprising heating the blank to a temperature of about 300° C. under a flowing hydrogen atmosphere for about 16 hours. Thereafter, the blank is removed from the treating chamber and examined.

Inspection of the lens blank thus provided indicates that uniform red surface coloration has been developed in the glass by the thermal reduction treatment, except in those regions of the glass exposed to the laser pretreatment. The latter regions exhibit light yellow coloration rather than red coloration, and appear in transmitted light to be essentially uncolored or transparent in contrast to the deep coloration of the remainder of the glass.

The appearance of patterned glass produced as above described is shown in FIG. 1 of the drawing, which consists of an optical photomicrograph taken at a magnification of 50× of an optical pattern developed in a colored photochromic glass in accordance with the described method. The background region of the field corresponds to glass which exhibits normal coloration as the result of the thermal reduction treatment. The "C" line pattern corresponds to the region of the glass surface exposed to the patterned laser pretreatment, that surface region exhibiting significantly lower optical density, particularly for short wavelength visible light, than the remaining surface of the glass.

As previously noted, the mechanism by which the method of the invention inhibits reduction coloration in photochromic glasses has not been fully explained. It is presently believed, however, that local heating of the glass under the conditions of Example 1 above could cause the silver halide crystallites near the surface of the glass to redissolve, or to otherwise change in composition and/or structure so that subsequent thermal reduction of the glass does not generate the silver/silver halide structure needed for the manifestation of strong thermal reduction colors. In any case, the heating of the glass into the transformation range by any suitable technique is presently considered to be sufficient to bring about the desired coloration resistance in treated portions of the surfaces of these glasses.

As also previously indicated, it is also possible to modify the surface coloration of glasses colored by thermal reduction treatments by a patterned heating of the glass after the reduction coloration has been developed. This procedure is illustrated by the following examples.

EXAMPLE 2

A photochromic sunglass lens blank such as described in Example 1 is selected for treatment. The lens blank has a thickness of about 1.5 mm and is composed of Corning Code 8111 glass.

To first develop reduction coloration in the surface of the lens blank, it is subjected to a coloring thermal reduction treatment as described in Example 1. Reduction is carried out under flowing hydrogen at 350° C. for 16 hours. Inspection of the lens blank at the conclusion of this treatment indicates that the surface of the blank has developed a uniform red surface color by the thermal reduction treatment.

Following reduction coloration of this lens blank, the blank is exposed to a patterned heat source to achieve localized heating of the glass surface. For this purpose, the blank is exposed without masking to the focused output of an ultraviolet laser emitting principally in the wavelength range of about 333–365 nm. The uv beam power of the laser is approximately 1 watt, and this beam is focused to a 1 mm. spot on the surface of the lens for approximately 10 seconds. The estimated surface temperature of the glass exceeds 450° C. at the end of this exposure.

Examination of the treated lens at the conclusion of this treatment indicates that the laser-treated spot has been converted to a light yellow color as the result of the localized heating. This spot color is in strong contrast to the deep red coloration of the remainder of the surface of the lens.

EXAMPLE 3

A photochromic sunglass lens blank as described in Example 1 is selected for treatment. The lens blank has a thickness of about 1.5 mm and is composed of Corning Code 8111 glass.

To pattern this lens blank, reduction coloration is first developed in the surface thereof in accordance with the thermal reduction treatment of Example 2. Thermal reduction is carried out under flowing hydrogen at 350° C. for 16 hours, following which the surface of the blank has developed a uniform red surface reduction color.

Following the coloration step, the blank is exposed to a patterned heat source to achieve localized heating of the glass surface. For this purpose the blank is exposed, through a ceramic mask defining a broken line pattern, to the infrared beam output of a $CO_2$ laser having a stated output power of 4 watts. As in Example 1, the laser is focused to a spot size of approximately 200 $\mu m$, and is caused to scan the mask and exposed glass at a traverse rate of approximately 1 mm/sec. This exposure heats the glass surface to a temperature which is estimated to lie in the transformation range of the glass.

Examination of the treated lens at the conclusion of treatment indicates that the laser-treated pattern has been converted to a light yellow color as the result of the localized heating. The pattern color is in strong contrast to the deep red coloration of the remainder of the surface of the lens.

Figure 2:
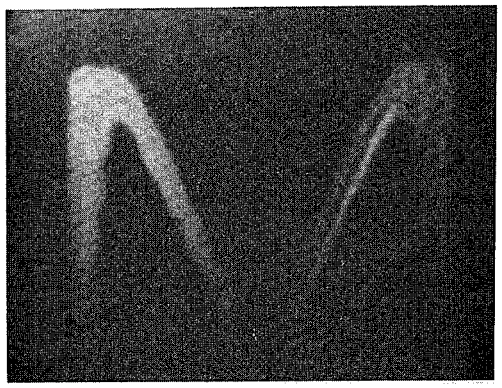
FIG. 2 of the drawing is an optical photomicrograph taken at a magnification of 78× showing a color pattern developed in a surface-colored photochromic glass in accordance with a second embodiment of the invention.

FIG. 2 of the drawing shows the appearance of a patterned glass article produced according to the above method. FIG. 2 consists of an optical photomicrograph taken at a magnification of 78× of a glass sample so treated, the dark region of the field corresponding to a surface region which exhibits normal coloration as the result of the thermal reduction treatment.

The bright line pattern corresponds to the region of the glass surface exposed to the patterned laser pretreatment. The exposed region exhibits significantly lower optical density, particularly for short wavelength visible light, than the remaining surface of the glass.

Of course, as previously noted, the invention is not limited to the treatment of any particular photochromic glass but can be used to pattern a wide variety of silver halide containing photochromic glasses as hereinabove set forth. Further, patterned heating sources other than the sources specifically exemplified herein, as well as any of the various thermal reduction treatments known in the art for developing deep coloration in photochromic glasses, may alternatively be employed.

The invention has particular utility for the marking, for identification or decoration purposes, of photochromic glass lenses or other small glass articles which are to be exposed to thermal reduction color processing at a point late in the manufacturing and distribution cycle where decorative or identifying patterning of the glass may no longer be economically attractive. Thus the process of the invention is particularly suited to the permanent application to the glass, at the point of glass article manufacture, of a latent design, logo, or other indication of origin which can conveniently be developed in the glass by subsequent thermal reduction coloring under a wide variety of treatment conditions.

We claim:

1. A method for making a photochromic glass article exhibiting a surface color pattern which comprises the steps of:
   (a) selecting for treatment a silver halide-containing photochromic glass article;
   (b) exposing a portion of the surface of the article to a patterned heat source for a time sufficient to raise the temperature of at least a part of the exposed portion above about 450° C.; and
   (c) thereafter heating the article under reducing conditions to a temperature not exceeding about 450° C. for a time sufficient to develop reduction coloration in portions of the surface layer other than the exposed portion.

2. A method in accordance with claim 1 wherein the photochromic glass article selected is substantially free of reduction coloration.

3. A method in accordance with claim 1 wherein the exposure of the glass to the patterned heat source is carried out for a time sufficient to heat a portion of the glass surface to the transformation range of the glass.

4. A method in accordance with claim 3 wherein the patterned heat source comprises an infrared laser radiation source.

5. A method in accordance with claim 4 wherein the patterned heat source further comprises an exposure mask.

6. A method in accordance with claim 1 wherein the step of heating the article under reducing conditions comprises heating the article to a temperature in the range of 250°–450° C. in a hydrogen atmosphere.

7. A method for making a photochromic glass article exhibiting a surface color pattern which comprises the steps of:

(a) selecting for treatment a silver halide-containing photochromic glass article comprising a reduction-colored surface layer thereon; and (b) exposing a portion of the surface layer to a patterned heat source for a time sufficient to raise the temperature of the exposed portion above about 450° C. to lower the optical density thereof.

8. A method in accordance with claim 7 wherein the patterned heat source comprises an ultraviolet laser.

9. A method in accordance with claim 7 wherein the patterned heat source comprises an infrared laser in combination with an exposure mask.

* * * * *